United States Patent [19]

Goel

[11] Patent Number: 4,696,992

[45] Date of Patent: Sep. 29, 1987

[54] THIOL CARBAMATES AS LATENT ACCELERATORS FOR CURING EPOXY RESINS

[75] Inventor: Anil B. Goel, Worthington, Ohio

[73] Assignee: Ashland Oil, Inc., Ashland, Ky.

[21] Appl. No.: 931,325

[22] Filed: Nov. 17, 1986

[51] Int. Cl.$^4$ .............................................. C08G 59/68
[52] U.S. Cl. ...................................... 528/90; 528/109; 528/367; 528/408
[58] Field of Search .................. 528/90, 109, 367, 408

[56] References Cited

U.S. PATENT DOCUMENTS

| | | | |
|---|---|---|---|
| 3,393,171 | 7/1968 | Vogt et al. | 528/90 X |
| 4,110,313 | 8/1978 | Schulze et al. | 528/90 |
| 4,437,892 | 3/1984 | Kelsey | 524/180 X |

FOREIGN PATENT DOCUMENTS 619297 5/1961 Canada .
855871 12/1960 United Kingdom .

*Primary Examiner*—Earl Nielsen
*Attorney, Agent, or Firm*—John F. Jones

[57] ABSTRACT

A process for accelerating the rate of cure of an epoxy resin formulation comprising including in the epoxy resin formulation a thiocarbamate which is the reaction product of a thiol and an isocyanate is described.

8 Claims, No Drawings

THIOL CARBAMATES AS LATENT ACCELERATORS FOR CURING EPOXY RESINS

This invention relates to a process for accelerating the cure of epoxy resins by inclusion in the epoxy resin formulation a thiocarbamate and more particularly pertains to the accelerated cure of two component epoxy resin systems comprising a polyepoxide component and a hardener component wherein there is included in the polyepoxide component a thiocarbamate accelerator.

Numerous curing agents for polyepoxides are known and have been described in the prior art. These curing agents include amines, amido-amines, phenolics, carboxylic anhydrides, mercaptans, and the like. Each curing agent has advantages and disadvantages which make it acceptable or unusuable for particular applications. Also, each curing agent, or combination thereof, may be used with one or more curing accelerators. Examples of such accelerators include the inorganic and organic metal salts such as lithium chloride and stannous octoate; onium salts such as ammonium chloride, alkyl phosphonium halides, etc. and boron trifluoride complexes. There is a need to develop curable epoxy resin compositions which cure very rapidly at moderately elevated temperatures and have very long open time (pot life) at room temperatures in applications such as structural adhesives, coatings and sheet molding compounds (SMC). The use of mono- and polycarbamates obtained from the reactions of thiols with mono-, and polyisocyanates as the latent heat curable accelerators has never been disclosed previously in the prior art.

Thiol-terminated thiol carbamates have been used as epoxy curing agents in the prior art (see U.S. Pat. Nos. 3,448,112; 3,553,283 and 3,472,913, for instance), and the curing mechanism involves the reaction of the free thiol groups with the oxirane rings of the polyepoxides (for instance, see U.S. Pat. No. 3,821,166 wherein polymercaptans are synthesized from a 2:1 mole ratio of trithiol and diisocyanate). Thus thiol-terminated thiol carbamates used in the prior art are simply one type of mercaptan curing agent and are not accelerators and particularly not latent accelerators as are the mercaptan-free thiocarbamates embodied in the present invention.

As stated above, many curing agents are known for epoxy resins (polyepoxides) including amines, carboxylic acid anhydrides, mercaptans and others which may be employed with one or more curing agents selected from the inorganic and organic metal salts such as lithium chloride and stannous octoate; onium salts such as ammonium chloride, alkyl phosphonium halides, etc. and boron trifluoride complexes. Use of these accelerators either results in reduction of pot life of the mixture of the two components at room temperature or requires much elevated temperatures for the acceleration effect to take place. There is a need to develop curable epoxy resin compositions which cure rapidly at moderately elevated temperatures without the sacrifice of the long open time or pot life.

I have discovered that the use of certain thiol carbamates obtainable from the reaction of thiols (mono- and polythiols) with mono- and polyisocyanates, in the epoxy resin compositions comprising polyepoxides and curing agents or hardeners (usually amines), provides the desired latent acceleration. Thus, heat curable compositions exhibiting improved thermal latency are obtained from epoxy compositions comprising mixtures of (1) a polyepoxide component, and (2) a hardener component which is often an amine hardener containing primary, secondary and tertiary amino and amido amine groups, and (3) a thiol carbamate. The thiol carbamates (blocked isocyanates) which show the latent acceleration embodied in the present invention include the reaction products of mono- and polythiols with aliphatic and aromatic mono- and polyisocyanates and contain one or more of the following groups: —(—SCNH—)— and are free of thiol groups.

In synthesizing the thiol carbamates of the present invention, the equivalent ratio of thiol to isocyanate should be no greater than 1:1 respectively. Higher isocyanate equivalents (but not the thiol) may also be used, that is to say, the thiol carbamates useful in this invention do not contain any free thiol or mercaptan functionality for the reason that free mercaptan functionality would serve as a curing agent and cause premature cure of the polyepoxide.

The thiols or mercaptans useful in the instant invention include monothiols such as alkyl-3-mercaptopropionate, alkyl thio glycolate, glycerol monothiol glycolate, thio glycerol, thiophenol, alkyl thiols, dithiols and polythiols such as alkylene dithiols, alkylene ether polythiols, glycol dimercaptoacetate, dipentaerythritol tetrathio glycolate, polyethylene glycol dimercapotoacetates, polyethylene glycol di(3-mercaptopropionates), trimethylolethane tri(3-mercaptopropionate), trimethylolethane trithioglycolate, trimethylolpropane trithioglycolate, 2,2'-dimercapto diethyl ether, and the like and others. Other polythiols to be used in this invention include methanedithiol, 1,1-propanedithiol, 1,1-dimercaptoisoctane, 2,2-propanedithiol, 3,3-pentanedithiol, a,a-toluenedithiol, 1,2-ethanedithiol, trimethylene-1,3-dithiol, 1,2-propanedithiol, 1,4-tetramethylenedithiol, 2,3-butanedithiol, 1,5-pentamethylenedithiol, 2,2-dimethylpropanedithiol-1,3, 1,6-hexamethylenedithiol, 1,2-hexanedithiol, a,a-decamethylenedithiol, 1,6-dimethyloctanedithiol-3,7, 2,6-dimethyloctanedithiol-2,6, pentadecanedithiol-7,8, octadecamethylene a,a-dithiol, 1,2-cyclohexanedithiol, 1,1-bis(mercaptomethyl)cyclohexane, 3,4-thiophenedithiol, propanetrithiol-1,2,3, neopentanetetrathiol, dithiocatechol, dithioresorcinol, dithiohydroquinone, 4,5-dimethyldithioresorcinol, 2,4-dimethyldithiorescorcinol, 4-ethyldithioresorcinol, 2,5-dichlorodithioresorcinol, 1,4-naphthalenedithiol, 1,5-naphthalenedithiol, 2,6-npththalenedithiol, 2,7-naphthalenedithiol, 2,2'-dimercaptobiphenyl, and 4,4'-dimercaptobiphenyl.

Polyepoxides useful in the epoxy resins of this invention can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms and the like.

Typical epoxy components suitable in the practice of this invention include those disclosed in U.S. Pat. Nos. 1,500,600 and 2,324,483 which are incorporated herein by reference. Preferred in this invention are 1,2-epoxy compounds having an epoxide equivalence greater than 1, that is to say, compounds containing more than one group of the formula:

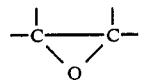

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable expoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolenfinically unsaturated carboxylic acid esters, such as methyl-9,10,12,13-diepoxy stearate or the dimethyl ester of 6,7,10,11-diepoxyhexadecane-1,16-dicarboxylic acid. Furthermore, there may be mentioned epoxidized mono- or polyesters, and mono- or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The isocyanates useful in this invention for the formation of the thiol carbamates include monoisocyanates including alkyl and aryl isocyanates of the formula RNCO wherein R represents an alkyl group having from 4 to 20 carbon atoms, an aryl group having from 6 to 20 carbon atoms, an alkaryl group having from 7 to 20 carbons or a cycloaliphatic group having from 6 to 20 carbon atoms. Typical monoisocyanates include phenyl isocyanate, benzyl isocyanate, cyclohexyl isocyanate and the like.

Other isocyanates useful in this invention are the polyisocyanates including organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,2-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

The thiol carbamates useful in the present invention may be used by dissolving, blending, or suspending them in the epoxy resin (polyepoxide) component of the two component epoxy composition and may be used in amounts ranging from about 0.2 to about 20% by weight of the epoxy resin component. Additives and diluents such as butadiene/acrylonitrile rubber, monoepoxides, lactones and organic carbonates may also be included in the epoxy resin component. The hardener component may consist of primary, secondary and tertiary amines, phenolics and optionally, free oximes and other epoxy curing catalysts and promoters known in the art. Suitable amines include aliphatic or aromatic amines and short or long chain amines with hydrocarbon, alkylene ether, etc. groups in the chain. The hardener components may be filled with fillers, pigments, metals and metal oxides for induction curing, etc. if desired.

The products of the process of this invention can be utilized in many applications such as for coatings, adhesives, sheet molding compounds, reinforced plastics, cement and the like and in the preparation of reinforced composite products such as laminated products, filament windings, molding powders, potting compounds and the like.

This invention is further illustrated in the following representative examples.

EXAMPLE 1

To 13.4 g of polyethylene glycol di(3-mercaptopropionate) (mercaptan equivalent weight 163) dissolved in 50 g of dry toluene was added 0.03 g of dibutyltin dilaurate and 0.03 g of N,N',N"-tris(dimethylaminopropyl) hexahydrotriazine followed by dropwise addition of 9.7 g of phenyl isocyanate. The reaction mixture was stirred at room temperature for three hours during which time a white solid precipitated. The solid thiocarbamate was isolated by filtration and was washed with pentane and dried under reduced pressure.

EXAMPLE 2

A liquid diglylcidyl ether of Bisphenol-A (epoxy equivalent weight of about 185) was allowed to react with 10% by weight of a carboxylic acid terminated butadiene/acrylonitrile rubber (18% by weight of acrylonitrile in the rubber) (B. F. Goodrich 1300 X 8 Hycar rubber) and the resulting liquid was blended with 5% by weight of the thiocarbamate of Example 1. A 10 g portion of this mixture was mixed with 7 g of a hardener composition composed of 76.5 parts by weight of an amido amine prepared by the reaction of diethylene triamine with linoleic acid, 17.6 parts by weight of poly(propylene oxide) triprimary amine (molecular weight of 3100) and 5.9 parts by weight of aminoethyl piperazine. The resulting mixture was split into two parts and one part was kept at room temperature to determine the room temperature open time while the second part was heated at 112° C. The portion kept at room temperature was found to gel in about five hours, whereas the heated portion gelled in about 2.3 minutes, indicating the system has a reasonably long pot life at room temperature and will cure rapidly at moderately elevated temperature.

EXAMPLE 3

This is a comparative example outside the scope of the present invention. The procedure of Example 2 was followed using the epoxy resin (5 g) without the thiocarbamate and with 3.5 g of the hardener of Example 2. The mixture was heated at 112° C. and gelation required at least 3 minutes.

EXAMPLES 4-11

An epoxy resin was prepared by dissolving 8% by weight of the thiocarbamate of Example 1 in a liquid diglycidyl ether of Bisphenol-A (epoxy equivalent weight 185). The resulting solution was allowed to react with various amine hardener compositions. The cure speeds at elevated temperatures and room temperature open times are listed in the following Table. Examples 5 and 9 in the Table are given for comparative purposes and otherwise are outside the scope of this invention.

TABLE

| Example No. | Epoxy (g) | Accelerator (g) | Hardener | (g) | RT (hrs) | 108° C. (min) |
|---|---|---|---|---|---|---|
| 4 | 4.6 | 0.4 | D400 | (3.2) | >6 | .3 |
|   |     |     | AEP  | (0.8) |    |    |
| 5 | 4.6 | None | D400 | (3.2) | >6 | 3.8 |
|   |     |      | AEP  | (0.8) |    |     |
| 6 | 4.6 | 0.4 | D400 | (2.7) | >6 | 3.7 |
|   |     |     | AEP  | (0.3) |    |    |
| 7 | 4.6 | 0.4 | DT403 | (2.8) | >5 | 3.4 |
|   |     |     | BAPP  | (0.3) |    |    |
| 8 | 5 | 0.5 | D400 | (4.5) | >15 | 15 |
| 9 | 5 | None | D400 | (4.5) | >15 | 23 |
| 10 | 4.6 | 0.4 | D400 | (2.5) |    |    |
|    |     |     | BPA  | (0.5) | >4 | 2.7 |
|    |     |     | AEP  | (0.2) |    |    |

RT = Room temperature
D400 = 400 molecular weight poly(propylene oxide) diprimary amine
AEP = aminoethylpiperazine
BAPP = bis(aminopropyl) piperazine
BPA = Bisphenol-A

I claim:

1. A process for accelerating the rate of cure of an epoxy resin formulation comprising including in the epoxy resin formulation a thiocarbamate cure accelerator.

2. The process of claim 1 wherein the epoxy resin formulation is composed of a mixture of a polyepoxide component and a hardener component.

3. The process of claim 2 wherein the polyepoxide is a compound containing more than one group of the formula

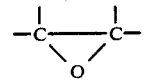

4. The process of claim 3 wherein the thiocarbamate is one obtained by the reaction of a thiol with an isocyanate.

5. The process of claim 4 wherein the thiocarbamate is one in which the equivalent ratio of thiol to isocyanate is no greater than 1:1, respectively.

6. The process of claim 5 wherein the thiocarbamate is present in the polyepoxide component.

7. The process of claim 5 wherein the thiocarbamate is one resulting from the reaction of polyethylene glycol di(3-mercaptopropionate) and phenyl isocyanate.

8. The process of claim 5 wherein the polyepoxide is a diglycidyl ether of Bisphenol-A and the hardener component is an amine.

* * * * *